Aug. 21, 1945.  J. L. BROCCO ET AL  2,382,971
WOODWORKING MACHINE TOOL
Filed Sept. 2, 1941   3 Sheets-Sheet 1
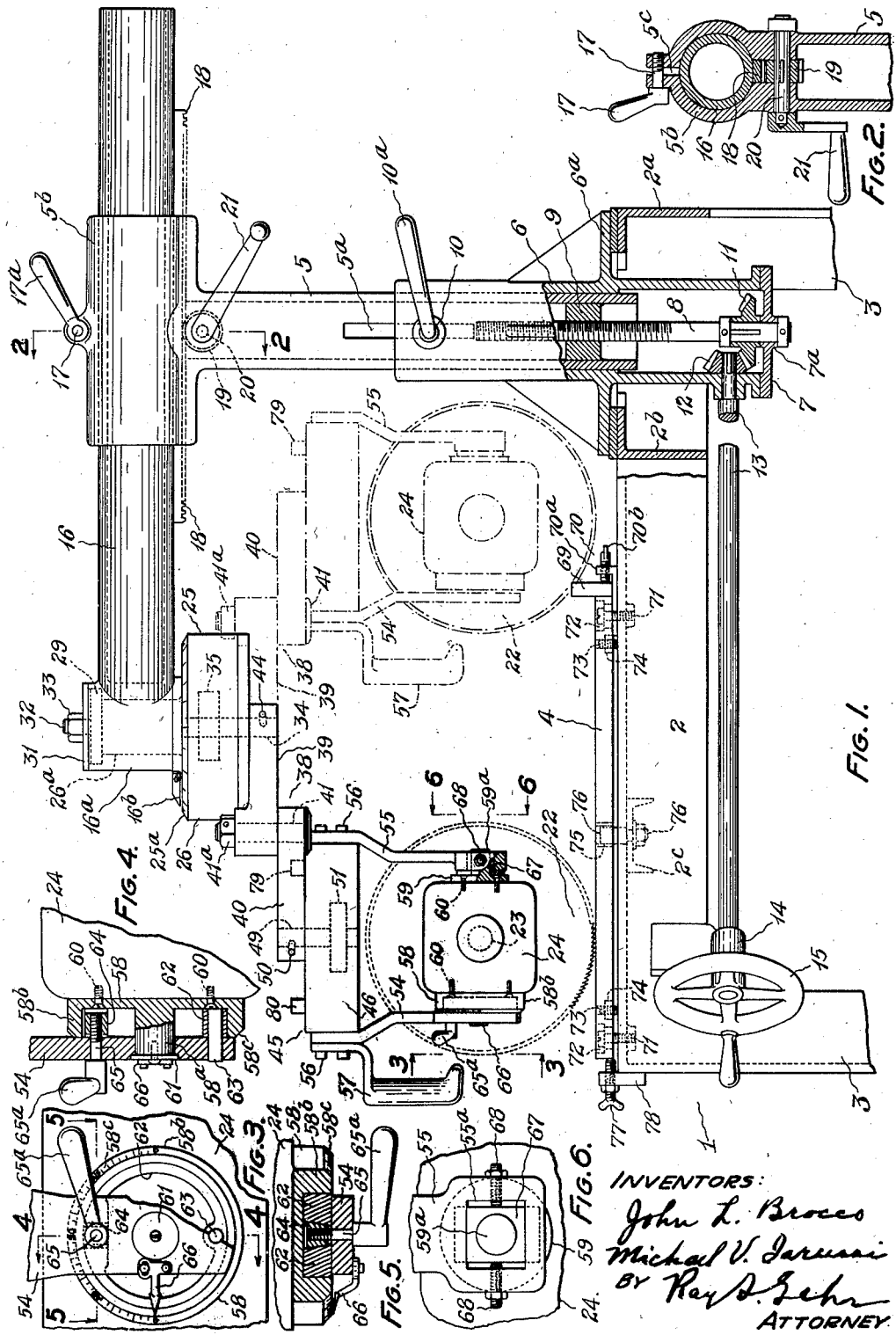
INVENTORS:
John L. Brocco
Michael V. Iarussi
BY Ray S. Gehr
ATTORNEY Aug. 21, 1945.    J. L. BROCCO ET AL    2,382,971
WOODWORKING MACHINE TOOL
Filed Sept. 2, 1941    3 Sheets-Sheet 2
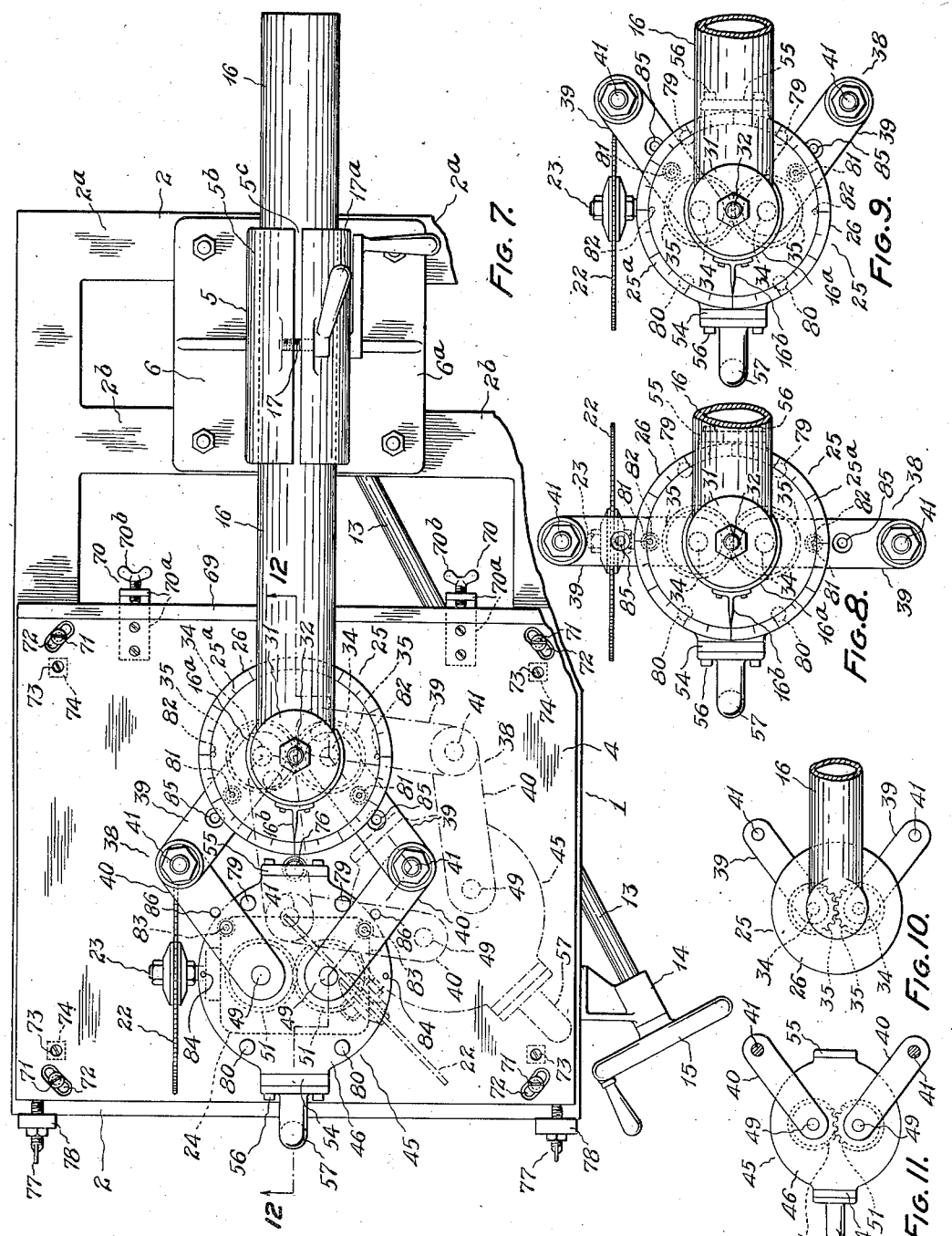
INVENTORS:
John L. Brocco
Michael V. Iannuzzi
BY Ray S. Frehr
ATTORNEY.

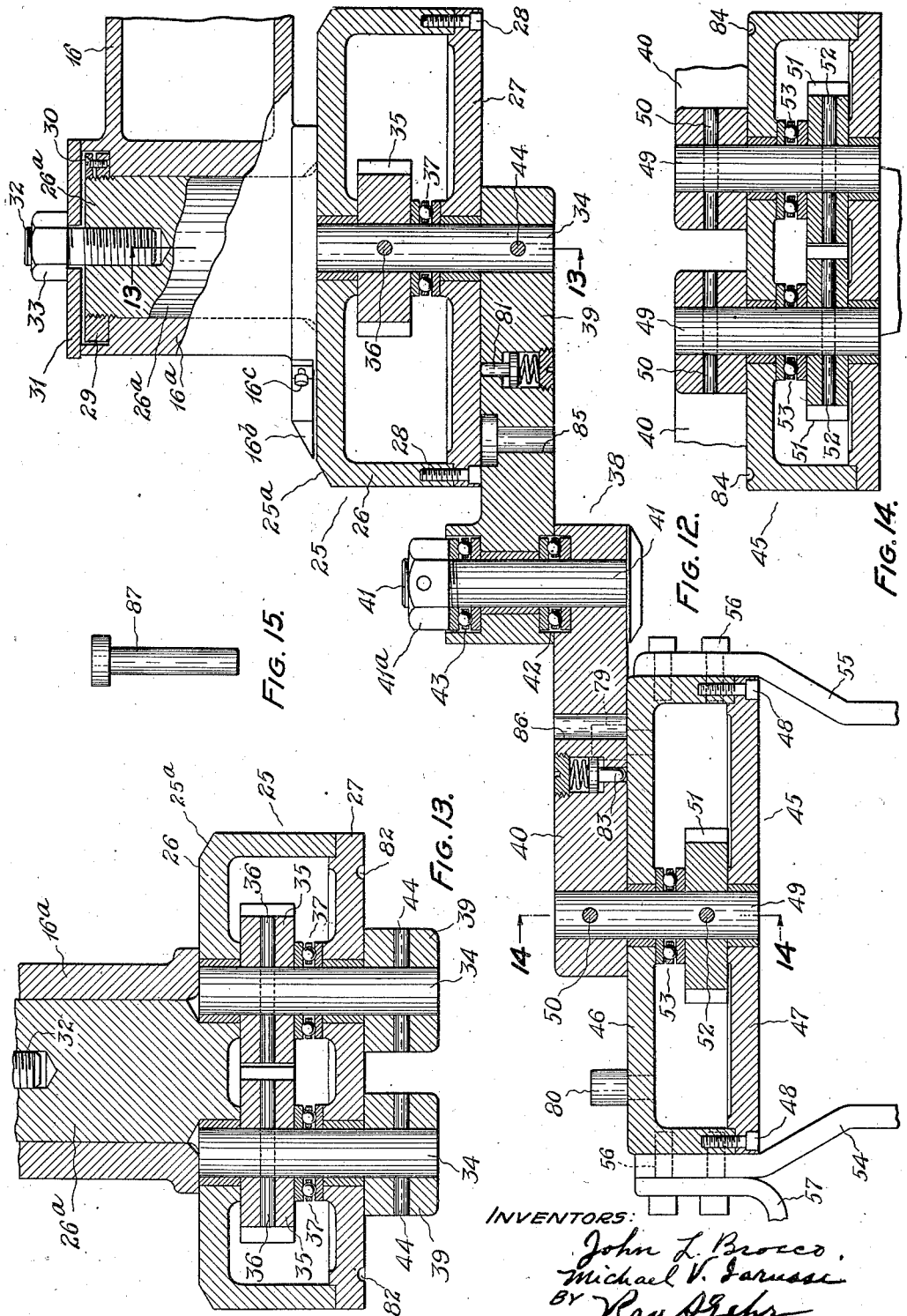

Patented Aug. 21, 1945

2,382,971

UNITED STATES PATENT OFFICE 2,382,971

WOODWORKING MACHINE TOOL

John L. Brocco and Michael V. Iarussi, Bedford, Ohio

Application September 2, 1941, Serial No. 409,244

3 Claims. (Cl. 143—6)

This invention relates to machine tools and particularly to tools of the type in which provision is made for holding the work stationary and in which the cutting instrument is power driven and supported movably to be advanced against the work, such tools being especially adapted for work on wood and other easily worked materials.

The chief object of the invention is to provide such a machine tool having means for movably supporting the power driven cutter which provides for a wide range of adjustments and movements of the cutter so as to adapt the tool to perform satisfactorily a great variety of operations, which is adapted to hold the tool accurately in its operative position or path of movement, which is adapted by a simple and easily effected movement to hold the cutter stationary in operations in which it is desirable to move the work instead of the cutter and which is structurally simple, rugged, durable and adapted to be maintained in good working order over long periods of use with a minimum of service attention.

Another object of the invention is to provide a machine tool of the class referred to having a work support or table which is adjustable in a manner to insure accurate support of the work in relation to the path of movement of the cutting tool.

The invention has for a further object the provision of a machine tool of the class in question in which the bearings, gears and other working parts are effectively enclosed and protected from dust and other foreign matter.

Other objects of the invention more or less incidental or ancillary to those specifically mentioned will appear in the following description.

With the enumerated objects in view, the invention consists in certain combinations and arrangements of parts and features of construction hereinafter described and explained in detail with reference to an exemplary embodiment of the invention shown in the accompanying drawings.

In the drawings,

Fig. 1 is a side elevation, partly in section, of the main parts of a machine tool embodying the invention.

Fig. 2 is a vertical section taken on the line 2—2 of Fig. 1.

Fig. 3 is a fragmentary elevation showing a portion of the driving motor and the front adjustable mounting for the same viewed in the direction of the arrows 3—3 in Fig. 1, some of the supporting structure being broken away to better show details of the construction.

Fig. 4 is a vertical section taken on the line 4—4 of Fig. 3.

Fig. 5 is a horizontal section taken on the line 5—5 of Fig. 3.

Fig. 6 is an elevation of the pivotal rear support of the driving motor viewed in the direction of the arrows 6—6 in Fig. 1.

Fig. 7 is a plan view of the apparatus shown in Fig. 1.

Fig. 8 is a fragmentary plan view showing the cutting tool and the movable tool and carrier moved rearward to an intermediate position of its full path of movement with the tool carrier and the tool support in vertical alignment and with the toggle linkages which support the movable tool carrier from the fixed tool support fully collapsed with the two links of each linkage also in superposed or vertical alignment.

Fig. 9 is a plan view similar to Fig. 8 but with the joint of each of the toggles swung rearward so as to effectively lock the tool carrier against movement relative to the tool support.

Fig. 10 is a diagrammatic plan view on a reduced scale showing the tool support and one link of each pair attached thereto, with the links in the angular positions shown in Fig. 9.

Fig. 11 is a corresponding plan view of the tool carrier and the other link of each of the two pairs thereof, with the links in the same positions shown in Fig. 9.

Fig. 12 is an enlarged vertical sectional view through the tool support, the tool carrier and one of the two toggle linkages connecting the support and carrier, the section being taken on the broken line 12—12 of Fig. 7.

Fig. 13 is a vertical transverse section on the line 13—13 of Fig. 12.

Fig. 14 is a vertical transverse section on the line 14—14 of Fig. 12.

Fig. 15 is a side view of a locking bolt.

Referring in detail to the construction illustrated, 1 designates as an entirety a base structure comprising a rigid rectangular top frame 2 and legs 3 rigidly attached thereto and adapted to support the top frame from the floor.

Attached to the top of frame 2 is a work table 4 which will later be described in detail.

The power driven tool is operatively supported above the frame 2 and table 4 by means comprising an upright tubular column 5 which is vertically adjustable in a tubular pedestal 6 which is formed with a flange 6ª that is supported on the top of the rear transverse member 2ª of the frame 2 and a supplementary transverse member 2ᵇ thereof, the pedestal being secured to the frame 2 by bolts or the like as indicated in Fig. 7.

The tubular pedestal 6 is closed at its lower end by a plate 7 which has a bearing boss 7a to support a screw threaded spindle 8 which operatively engages a nut 9 welded or otherwise fixedly secured in the lower end of the tubular column 5. The column 5 is formed exteriorly with an elongated slot 5a to receive the inner end of a locking screw 10 adjustably mounted in the upper part of pedestal 6 and having a handle 10a by which it can be tightened to rigidly lock the column 5 to the pedestal 6 or loosened to permit vertical adjustment of the column.

Such adjustment of the column 5 is effected by manually operable gearing comprising a bevel gear 11 which is keyed on the spindle 8, a bevel pinion 12 meshing with gear 11 and keyed on a spindle 13 which has a bearing support adjacent the pinion in the wall of the pedestal 6 and a further bearing support 14 secured to the base frame 2 near the front thereof. A hand wheel 15 is mounted on the front end of spindle 13 so that the operator standing in front of the machine can conveniently adjust the column 5 upward and downward by rotation of the hand wheel. When the desired adjustment has been effected column 5 can be rigidly locked to the pedestal 6 by means of the locking bolt 10.

The column 5 carries a cantilever arm 16 at its upper end, the column being formed with a transverse tubular head part 5b in which the arm 16 is slidably mounted. The head 5b of the column is longitudinally split at the top, as shown at 5c in Fig. 2, and is provided with a clamping screw 17 having a handle 17a by means of which part 5b can be made to firmly clamp arm 16 or, by loosening the screw 17, can free the arm 16 for adjustment. To facilitate longitudinal adjustment of the arm it is fitted on its under side with a rack 18 which is accommodated by a slot in the head 5b and the column is provided with a pinion 19 to mesh with and actuate the rack, the pinion being keyed to a shaft 20 having an actuating crank 21. From an inspection of Fig. 1 it will be noted that the rack 18 serves as a spline to prevent rotation of the arm 16 in the head 5b.

In the machine shown in the drawings the cutting tool is a rotary saw 22 which is mounted on the shaft 23 of an electric motor 24 and which may be provided with the usual protective guard, which is omitted from the drawings in the interest of clarity. This motor-cutter unit is supported from the front end of the cantilever arm 16 by improved mechanism which will now be described. At its front end the arm 16 is formed with a vertical tubular part or sleeve 16a to which is adjustably attached a motor support designated as an entirety by the numeral 25 (see Figs. 1, 12 and 13). The support 25 comprises an inverted cylindrical cup shape part 26 which is closed at its lower side by a circular plate 27 tightly secured to part 26 by cap screws 28. At its upper side the support member 26 is formed with an upstanding cylindrical boss 26a which fits rotatably within the sleeve 16a of the arm 16 and is rotatably suspended in the arm by a slotted ring 29 threaded on the upper end of boss 26a and locked thereto by a locking screw 30. To enable the support 25 to be clamped in any desired angular position in relation to arm 16 a circular plate 31 is arranged on the upper end of sleeve 16a to be frictionally clamped thereto by means of a stud bolt 32 and nut 33. The support 25 is provided on its upper peripheral beveled corner with a scale 25a graduated in angular units and a pointer 16b adjustably secured by screws 16c to the outer end of the arm 16 is arranged to cooperate with the scale 25a and facilitate adjustment of the support 25 to any angular position in relation to the arm.

The support members 26 and 27 are formed with vertically disposed bearings in which are mounted a pair of shafts 34, 34 to which are secured, within the casing formed by the parts 26, 27, a pair of gears or pinions 35, 35, each gear being secured to its shaft by a pin 36. The two gears are arranged in mutually meshing engagement so that they can turn on their axes only in unison and in opposite directions. Ball bearings 37, 37 are interposed between gears 35 and adjacent bosses formed on the plate 27, these antifriction bearings serving to take any downward load on the shafts 34, 34.

To the lower end of each of the shafts 34 is fixedly secured a toggle linkage designated as an entirety by the numeral 38 (Fig. 12). Each toggle linkage comprises a link 39 and a link 40 which are pivotally connected together by a pivot pin 41 which is operatively secured by a nut 41a and is fitted with an antifriction bearing 42 between adjacent ends of the links 39 and 40 and a similar bearing 43 between the upper side of link 39 and the nut 41a. The link 39 is fixedly secured to its shaft 34 by pin 44.

Each of the two toggle linkages has the front end of its link 40 operatively connected with a movable tool carrier which is designated as an entirety by the numeral 45 and comprises an inverted cup shaped part 46 and a circular plate 47 secured to the bottom of the part 46 by cap screws 48, 48. The carrier parts 46 and 47 are formed with bearings in which are operatively mounted a pair of shafts 49, 49. The upper end of each of these shafts 49, 49 is rigidly secured by a pin 50 in the apertured front end of one of the links 40. Within the casing formed by the carrier parts 46 and 47 are a pair of gears 51, 51 secured by pins 52, 52 to the shafts 49, respectively. An antifriction bearing 53 is interposed between the top side of each gear 51 and the adjacent under side of the carrier part 46. The gears 51, 51 are arranged to mutually mesh together just as in the case of the gears 35, 35 and, like the latter, can turn only in unison and in opposite directions.

The tool carrier 45 is provided with a pair of depending yoke arms 54 and 55 which are secured to the carrier 45 by cap screws 56, 56. The screws 56 which fasten the yoke arm 54 serve also to secure the operator's handle 57 as is best shown in Fig. 1. The motor 24 is adjustably supported in the lower ends of the yoke arms 54 and 55. To this end the motor is provided with trunnion means to engage the lower ends of the arms 54 and 55. The front motor trunnion is provided by trunnion member 58 and the rear motor trunnion by member 59, said members being separately formed and secured to the motor frame by screws 60, 60.

The front trunnion member 58 is formed with a trunnion proper 58a which fits in a suitable aperture in the lower part of the yoke arm 54 which is secured on the trunnion by a plate 61 attached to the end of the trunnion. The part 58a has a forwardly extending peripheral flange 58b, the inner face of which cooperates with a split clamping ring 62 which is anchored on a pin 63 carried by the lower end of the yoke arm 54. Between the adjacent free ends of the clamp ring 62 is arranged a tapered cam block 64 which has a threaded aperture to receive an operating screw 65 which is fitted with an operating handle 65ª. By turning this handle the screw moves the cam block 64 forward or backward in relation to the beveled ends of the clamping ring in a manner to tighten or loosen the clamp, as will be understood from an inspection of Figs. 4 and 5 of the drawings. The flange 58ᵇ has its outer beveled corner provided with a scale 58ᶜ graduated in angular units and arranged to cooperate with a pointer 66 carried by yoke arm 54 and thus serving to indicate angular positions of the motor. By loosening the clamping screw 65 the motor can be adjusted to any desired angular position and then rigidly clamped in such position by tightening said screw.

The trunnion member 59 on the rear side of the motor 24 is formed with a trunnion proper 59ª which engages a rectangular bearing block 67 which is mounted for transverse adjustment in a rectangular aperture 55ª in the lower end of the yoke arm 55. To facilitate such adjustment and secure the bearing block 67 in adjustd position, yoke arm 55 is provided with a pair of adjusting screws 68 as shown in Fig. 6. The adjustment provided for the bearing block 67 is limited in extent and designed only to secure suitable alignment of the cutting tool with its path of bodily movement, as will later be explained.

From an inspection of the drawings it will be seen that the motor driven saw is movably supported from the overhead arm 16 through the toggle linkages which have been described, and that, since the two toggle linkages are symmetrically arranged relative to a vertical plane through the axis of arm 16 and support 25 and since the two arms 39 of the two toggle linkages are operatively connected to move in unison by means of the gears 35, 35 while the links 40, 40 of the linkages are similarly operatively connected by gears 51, 51 to similarly move in unison in opposite directions, the tool carrier 45 is constrained to move in a fixed straight path when the joints of the two toggle linkages are flexed. Either of the two toggle linkages, 39, 40 may be considered as means for movably connecting the carrier 45 to the support 25 while the other toggle linkage and the connecting gears 35 and 51 serve as means to control the pivotal movements of the first linkage and guide the movement of the carrier relative to the support. Furthermore, it will be seen that the toggle links are so disposed in vertical relation to each other and to the tool support 25 and the carrier 45 that the tool carrier and the motor driven tool thereon can be moved along their straight path through a relatively great range. That is to say, the tool carrier 45 when it is moved toward the rear of the machine from the position shown in Fig. 7 may not only move to a position adjacent the support 25 but may continue rearward beneath the support and for a considerable distance to the rear of the support 25, leaving the space in front of the support wholly unobstructed and providing maximum freedom of movement for the operator. This result is due to the fact that the supporting links 39, 39 are mounted in offset relation to the support 25 to move out of a zone extending forward from the support and into a zone extending rearward from the support when the carrier is moved rearward, while the links 40, 40 are disposed in offset relation to the links 39, 39, so as to be free at the same time to move to the rear of said links 39, 39. In other words, the linkage collapses when the carrier is moved rearward or forward toward the support and expands when the carrier is moved rearward or forward away from the support. During the rearward movement of the tool carrier (and, of course, during its forward movement also) said carrier is adequately supported and held to a path of parallelism by the mutual bearing connections between the tool support 25, the toggle links 39, the toggle links 40 and the carrier 45. By providing antifriction bearings at the points indicated in the drawings and above described, and by limiting the range of flexing of the toggle joints as hereinafter explained, the movement of the cutting tool can be effected with a very moderate manual exertion.

In order suitably to support the work while the saw or other cutting tool is moved in relation to the work, the work table 4, which may suitably be made of wood, is provided with a fence 69 which is adjustably secured to the rear edge of the table 4 by two or more screw clamps which are designated as entireties by the numeral 70 and comprise a metal angle member 70ª secured to the table 4 and a thumb screw 70ᵇ mounted in the upstanding end of the angle 70ª so as to adjustably engage the fence 69. Such fence is appropriately made of wood and, of course, can readily be renewed from time to time.

The work table 4 is secured to the frame 2 at each of the four corners thereof by means of a cap screw 71 which extends through slot 72 in the table to engage a threaded hole in the frame 2. The table is further fitted at each corner with a leveling screw 73 which engages a threaded metal insert 74 in the table top. By suitably adjusting the four screws 73 the table can accurately be leveled and then secured in position by tightening the screws 71.

The slots 72 of the table top are arcuate in form and concentric with a bearing aperture 75 in the center of the table top which receives a stud 76 secured to a transverse member 2ᶜ of the frame 2. Provision is thus made for angular or rotational adjustment of the table top. Such adjustment is effected by means of two adjusting screws 77, 77 of which one is arranged at each end of the two front corners of the table top, being mounted in a bracket 78 secured to the front of the frame 2 by welding or other suitable means.

To effect the angular adjustment of the table, screws 71 are loosened and screws 77 suitably adjusted to turn the table top on the trunnion 76, whereupon the screws 71 are tightened to firmly clamp the table in adjusted position. By means of this adjustment an accurate positioning of the work in proper relation to the path of movement of the motor driven cutter is insured.

As is well known, it is characteristic of a toggle linkage that the spreading force exerted by the two ends of the linkage due to force applied to the joint thereof, approaches infinity as the joint nears the center line of the linkage. Correspondingly when the linkage is employed in such a way that the exterior operating force is applied to one end of the linkage, frictional resistance in the joint of the linkage becomes relatively powerful to resist the applied external force as the joint approaches the center line. Accordingly in the supporting linkages employed we limit the approach of the toggle joints toward the center lines thereof so as to attain ease of manual movement of the tool carrier 45 in relation to the support 25. To this end the top part 46 of the carrier 45 is fitted with two pairs of upstanding pins 79, 79 and 80, 80 and these pins serve to limit the angular swinging movement of the links 40, 40 in a manner which will be apparent from an inspection of Fig. 7 of the drawings. In this figure it will be seen that the tool carrier 45 has been moved rearward in relation to the support 25 until links 40, 40 have been brought into engagement with the stop pins 79 which prevent further forward movement. On the other hand, when the tool carrier is moved rearward to a position indicated by dotted lines in Fig. 1, such movement is there stopped by the engagement of the links 40, 40 with the stop pins 80, 80.

In the use of our improved tool, it is possible to lock the tool carrier in fixed position when said carrier is directly below the tool support 25. To facilitate such positioning of the carrier, the link 39 of each of the toggle linkages is fitted with a spring pressed detent 81 and the closure plate 27 of the support 25 has its under surface formed with two diametrically opposite sockets 82 to receive the rounded ends of the detents 81 when the links 39 come into transverse diametrical alignment. Similarly each of the toggle links 40 is fitted with a spring pressed detent 83 arranged to engage diametrically opposite sockets 84 in the top of the tool carrier 45 (see Figs. 12, 13 and 14). When the carrier 45 is moved into vertical alignment with the support 25 the spring detents 81 and 83 snap into their respective sockets and thus audibly indicate as well as facilitate the alignment.

The tool carrier 45 can readily be locked in fixed position in vertical alignment with the tool support 25 when it is desired to have the cutting tool held against bodily movement while the work is moved in relation to said tool or when the tool is not in use. Such locking can be accomplished in either of two ways. In the use of tools of the character in question it is desirable at times to secure the tool in some convenient position only temporarily. This can readily be accomplished in the manner illustrated in Figs. 8 to 11, inclusive. In these figures the tool carrier 45 has been moved into vertical alignment with the tool support 25. In such position of the parts the normal positions of the links 39 and 40 of each toggle linkage are that of mutual vertical alignment and of longitudinal alignment with the corresponding links of the other toggle linkage, as shown in Fig. 8. When the links are in such position it is possible simultaneously to swing the jointed ends of the links 39 and 40 of each toggle linkage around the then coincident axes of their respective shafts 34 and 49 to some angular position such as is shown in Fig. 9, the links of the two linkages having such movement in unison because the two shafts 34 and the two shafts 49 are respectively connected together by the pinions or gears 35 and 51. As soon as the links of the two linkages are moved in this manner out of the stated longitudinal alignment the tool carrier is very effectively rigidly locked against movement in relation to the tool support 25. The reason for this will be apparent from an inspection of the diagrammatic Figures 10 and 11 which show that any movement of the tool carrier 45 is opposed by the links 39 and 40.

Thus it will be seen that when the tool carrier 45 is moved beneath the tool support 25 the spring detents 81 and 83 serve to facilitate the stopping of the carrier in vertical alignment with the support and thereupon the operator can with a quick and easy movement swing the linkages rearward as indicated in Fig. 9 to effect the desired locking of the tool, the rounded ends of the detents 81 and 83 being moved by cam action out of their cooperating sockets 82 and 84, respectively, to permit such movements of the links.

At times it may be desirable to have the tool carrier locked in relation to the tool support while more or less extended work is being carried out by movement of the work in relation to the tool and, if desired, the carrier can for such work be locked in another manner, namely, by inserting bolts or pins 87 through holes 85, 85 in the links 39, 39 and holes 86, 86 in the links 40, 40 when the links have been brought into alignment as shown in Fig. 8.

From the foregoing description the manner in which our improved machine tool operates in use will readily be understood without extended or detailed explanation. To prepare the machine for use certain preliminary adjustments should be made. First, the tool carrier 45 should be moved to its rearmost position and if its axis is not approximately directly beneath the longitudinal axis of the arm 16 the clamping nut 33 should be loosened and the carrier moved laterally approximately to such position of alignment and the clamping nut again tightened. Then the pointer 16$^b$ should be adjusted to coincide with the zero mark of scale 25$^a$.

Assuming that the cutting tool is a rotary saw blade, a check should be made to see that the saw blade is so supported as to be parallel to its path of movement when it is manually moved rearward and forward in relation to the table top and the work. This is readily done by making trial cuts of the saw and observing the width of the kerf cut. If it is found that the saw is not in accurate parallelism with its path of bodily movement this can readily be remedied by the necessary slight horizontal adjustment of the bearing block 67 in the rear yoke arm 55.

Another preliminary check should be made to see that the work table is level and that the fence 69 is at right angles to the path of movement of the saw. The manner of checking the level of the table and making any necessary adjustment will be obvious from the foregoing description. To check the angular position of the table and the fence a board is placed upon the table against the fence and the saw moved rearward to cut a trial kerf which can then be checked for angular position in relation to the fence and any needed adjustment made by means of screws 77 or, alternatively, by adjustment of pointer 16$^b$.

Finally there should be a preliminary check to see that when the saw blade is vertical the pointer 66 is at zero on the scale 58$^c$. This is readily accomplished by loosening the screw 65 of the clamp which secures the motor 24 to the yoke arm 54, adjusting the saw blade to a position at right angles to the level table 4, and then if need be the pointer 66 is adjusted to the zero position.

It will be seen that by the adjustable mounting of the scale pointers 16$^b$ and 66, of the bearing block 67 and the work table 4, accurate relative positioning of the working parts of the assembled machine is readily attained with a minimum requirement for accuracy in the formation of the various parts of the machine for the purpose of achieving that end. Furthermore, if in use of the machine the working parts of the device depart from their proper relative positions correction is very readily made by the simple adjustments referred to.

When a particular piece of work is to be done with the machine the position of the tool support 25 is adjusted, if need be, vertically and horizontally to accommodate the cutter to the size and shape of the work. The vertical adjustment is accomplished by simply loosening the clamp screw 10 in the column pedestal 6 and turning the hand wheel 15 in one direction or the other to raise or lower the column 5, and then tightening the screw 10 to rigidly fix the column 5 in position. Then the support 25 can be adjusted horizontally by loosening the clamping screw 17 and turning the crank 21 in one direction or the other to advance or retract the arm 16 in the head of the column 5, the clamping screw 17 being then tightened to rigidly secure the arm.

If the work to be done requires a simple right angle traverse of the saw, the motor-saw unit is adjusted so that the plane of the saw is vertical, such adjustment being indicated by the zero position of the scale 58c in relation to the pointer 66. Such adjustment, of course, is effected by simply loosening the clamping screw 65, turning the motor on its trunnions and then tightening the said screw.

The adjustments referred to having been made, the machine is handled in well known manner to perform the work. Those familiar with tools of the character in question will appreciate the advantage of the features of construction which have been described. In particular, the fact that the tool support 25 is midway between the front and rear ends of the tool movement renders the tool convenient to use since the relatively retracted position of the tool support 25 does not interfere with free movements of the operator. Full advantage is taken of this feature since the toggle linkages collapse rearward with the rearward movement of the cutting tool and its carrier 45. Furthermore the requisite movement of the tool carrier is secured with a minimum number and weight of parts.

When miter cuts are to be made with the tool, this is readily accomplished by loosening the clamping nut 33 on top of the front end of the arm 16 and adjusting the tool support 25 and the parts carried thereby, as indicated for example by dash lines in Fig. 7, to any desired angular position in relation to the arm 16, such adjustment being facilitated by the angular scale 25ª which is read with reference to the pointer 16ᵇ.

If bevel cuts, either straight or miter, are to be made, this is accomplished by adjustment of the motor-saw unit on the motor trunnions by loosening the clamping screw 65 and adjusting the motor-saw unit to the desired angle for the bevel, this adjustment being readily effected by reading the angular scale 58c in relation to the pointer 66.

If ripsawing is to be done, it may be advantageous to lock the tool carrier in fixed position in relation to the tool support in one of the ways previously described and then, with the motor-saw unit adjusted with the saw blade parallel to the fence of the work table, the work can be manually advanced in relation to the saw to effect the rip cut.

It will be understood, of course, that our improved machine tool is adapted to the use of a wide variety of cutters to perform various operations such, for example, as routing and shaping.

From what has been said it will be apparent without further explanation that our improved tool is exceedingly flexible in its applicability to various types of work such as cross cutting, mitering, bevel cross cutting, bevel mitering, straight and bevel ripping, dadoing, miter dadoing, routing, ploughing, etc. Furthermore, by reason of the manner in which the tool cutter is operatively supported for movement, the machine can be handled with ease and convenience in carrying out all of the various types of operation to which it is adapted.

It will be apparent from the drawings and from what has been said that practically all of the bearings and gears of various kinds are effectively enclosed and protected from dust and dirt so that with proper lubrication they will remain in prime working condition over long periods without cleaning or other attention. The provision of antifriction bearings where any considerable stresses are sustained insures easy manual movement of the motor driven cutter and that not only minimizes fatigue of the operator but favors smooth, non-jerky movements of the tool in relation to the work.

As is readily apparent from the machine shown in the drawings, the mechanism both as to individual parts and as an entirety is strong and rugged and adapted to operate over long periods with a minimum of attention and without loss of accuracy.

The present invention has been developed with special reference to woodworking uses but it is to be understood that the invention is also applicable to the working of other materials including metals, plastics and all substances susceptible of being worked by rotary tools.

It is also to be understood that the invention is not limited to the specific forms of construction illustrated and described but may be embodied in various mechanically equivalent forms within the properly construed scope of the appended claims.

What we claim is:

1. In a machine tool, the combination of a base structure; a work support on the base; an elevated tool support carried by the base and overlying the work support; a movable tool carrier; a rotary power-driven tool on the carrier; and a linkage constituting operative connections between the tool support and the carrier for sustaining the carrier at a level below that of the support and guiding it in straight line back-and-forth movements between positions respectively to the front of the support and to the rear thereof, the linkage having a plurality of interconnected links horizontally disposed below the level of the support and above the level of the carrier for pivotal movement on upright axes, the support, connecting links and carrier being disposed in mutual vertically offset relation and the linkage being constructed to collapse when the carrier is moved rearward or forward toward the support and to expand when the carrier is moved rearward or forward away from the support, whereby movement of the carrier to the rear of the support leaves the space in front of it unobstructed.

2. A machine tool as claimed in claim 1 in which the linkage operatively connecting the carrier to the tool support comprises a pair of toggle linkages each having one end pivotally connected on an upright axis to the tool support and its other end similarly connected to the carrier and operative connections between the ends of the links which are connected to the tool support and between the ends of the links which are connected to the carrier for causing equal and opposite angular movements of the links connected to the tool support and of the links connected to the carrier, respectively, the links connected to the tool support being disposed at a level below the support and above the other links and the carrier being disposed at a level below said other links.

3. A machine tool as claimed in claim 1 in which the linkage operatively connecting the carrier to the tool support comprises a pair of toggle linkages each having one end pivotally connected on an upright axis to the tool support and its other end similarly connected to the carrier and operative connections between the ends of the links which are connected to the tool support and between the ends of the links which are connected to the carrier for causing equal and opposite angular movements of the links connected to the tool support and of the links connected to the carrier, respectively, the links connected to the tool support being disposed at a level below the support and above the other links and the carrier being disposed at a level below said other links, and the toggle linkages having all of their links of the same length and their pivotal connections with the support the same distance apart as their pivotal connections with the carrier, whereby, when the links of each toggle linkage have been moved into mutual vertical alignment and longitudinal alignment with the corresponding links of the other toggle linkage, the links of each of the toggle linkages can be moved about the then coincident axes of their respective pivotal connections with the tool support and the carrier out of the said longitudinal alignment to effect the locking of the carrier against movement.

JOHN L. BROCCO.
MICHAEL V. IARUSSI.